United States Patent
Zhao et al.

(10) Patent No.: US 12,185,321 B2
(45) Date of Patent: *Dec. 31, 2024

(54) SIDELINK COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,724

(22) Filed: Mar. 10, 2023

(65) Prior Publication Data

US 2023/0217445 A1 Jul. 6, 2023

Related U.S. Application Data

(63) Continuation of application No. 17/366,593, filed on Jul. 2, 2021, which is a continuation of application No. PCT/CN2019/071497, filed on Jan. 11, 2019.

(51) Int. Cl.
*H04W 72/20* (2023.01)
*H04L 1/00* (2006.01)
*H04W 4/40* (2018.01)
*H04W 72/044* (2023.01)

(52) U.S. Cl.
CPC ........... *H04W 72/20* (2023.01); *H04L 1/0038* (2013.01); *H04W 4/40* (2018.02); *H04W 72/044* (2013.01)

(58) Field of Classification Search
CPC . H04W 72/1278; H04W 4/40; H04W 72/044; H04L 1/0083
See application file for complete search history.

(56) References Cited

U.S. PATENT DOCUMENTS

| | | | | |
|---|---|---|---|---|
| 9,888,505 | B2* | 2/2018 | Zhang | H04W 4/70 |
| 10,945,240 | B2* | 3/2021 | Chae | H04W 72/0453 |
| 11,963,208 | B2* | 4/2024 | Zhao | H04W 72/53 |
| 2018/0160460 | A1 | 6/2018 | Zhang et al. | |
| 2018/0206260 | A1* | 7/2018 | Khoryaev | H04W 72/1263 |

(Continued)

OTHER PUBLICATIONS

The first Office Action of corresponding KR application No. 10-2021-7020682, dated Oct. 20, 2023.

(Continued)

*Primary Examiner* — Parth Patel
(74) *Attorney, Agent, or Firm* — Ladas & Parry LLP

(57) ABSTRACT

The embodiments of the present application disclose a sidelink communication method, a terminal device and a network device. The method includes: determining, by a terminal device, a time frequency resource of a physical sidelink control channel (PSCCH) in a first time frequency unit; and receiving or transmitting, by the terminal device, the PSCCH on the time frequency resource. The method, the terminal device, and the network device in the embodiments of the present application help reducing the complexity of PSCCH detection by a terminal device at the receiving end.

15 Claims, 8 Drawing Sheets

(56) References Cited

U.S. PATENT DOCUMENTS

| | | | |
|---|---|---|---|
| 2019/0045526 A1* | 2/2019 | Lee | H04W 72/1263 |
| 2019/0069200 A1* | 2/2019 | Zhang | H04W 72/02 |
| 2019/0356451 A1* | 11/2019 | Zhang | H04L 5/0032 |
| 2019/0387377 A1* | 12/2019 | Zhang | H04W 52/281 |
| 2020/0029318 A1* | 1/2020 | Guo | H04W 72/042 |
| 2020/0029340 A1* | 1/2020 | He | H04W 72/02 |
| 2020/0052843 A1* | 2/2020 | Cheng | H04L 5/0051 |
| 2020/0053528 A1* | 2/2020 | Wang | H04W 72/044 |
| 2020/0106500 A1* | 4/2020 | Noh | H04B 7/0621 |
| 2020/0146000 A1* | 5/2020 | Shin | H04L 5/0053 |
| 2020/0146044 A1* | 5/2020 | Maaref | H04W 72/1278 |
| 2020/0153574 A1* | 5/2020 | Shin | H04W 72/0406 |
| 2020/0221423 A1* | 7/2020 | Wang | H04B 17/318 |
| 2021/0029688 A1* | 1/2021 | Zhang | H04W 72/0453 |
| 2021/0176735 A1* | 6/2021 | Deng | H04W 72/0453 |
| 2021/0203462 A1* | 7/2021 | Xiang | H04L 25/02 |
| 2021/0219268 A1* | 7/2021 | Li | H04W 72/02 |
| 2021/0242960 A1* | 8/2021 | Li | H04L 1/0026 |
| 2021/0243701 A1* | 8/2021 | Hong | H04L 5/001 |
| 2021/0243728 A1* | 8/2021 | Lee | H04L 5/00 |
| 2021/0250159 A1* | 8/2021 | Su | H04W 4/40 |
| 2021/0250881 A1* | 8/2021 | Lee | H04W 56/00 |
| 2021/0250931 A1* | 8/2021 | Yang | H04L 5/0053 |
| 2021/0266212 A1* | 8/2021 | Chae | H04L 27/26025 |
| 2021/0266868 A1* | 8/2021 | Shin | H04W 72/042 |
| 2021/0297221 A1* | 9/2021 | Lee | H04L 5/0055 |
| 2021/0306111 A1* | 9/2021 | Jung | H04L 1/08 |
| 2021/0314749 A1* | 10/2021 | Kwak | H04W 4/40 |
| 2021/0314921 A1* | 10/2021 | Yang | H04L 1/0004 |
| 2021/0314933 A1* | 10/2021 | Zhang | H04L 1/1607 |
| 2021/0321370 A1* | 10/2021 | Lee | H04W 72/0406 |
| 2021/0321385 A1* | 10/2021 | Lee | H04L 5/0048 |

OTHER PUBLICATIONS

MediaTek Inc., Physical layer structure for NR sidelink, R1-1810453, 3GPP TSG RAN WG1 Meeting #94bis, Chengdu, China, Oct. 8-12, 2018.

ZTE, Sanechips, Discussion on NR sidelink physical layer structure, R1-1812731, 3GPP TSG RAN WG1 Meeting #95, Spokane, USA, Nov. 12-16, 2018.

Ericsson, Physical layer structure for SL NR V2X, R1-1813638, 3GPP TSG-RAN WG1 Meeting #95, Spokane, WA, US, Nov. 12-16, 2018.

The first Office Action of corresponding AU application No. 2019421242, dated Aug. 9, 2024.

The NOA of corresponding KR application No. 10-2021-7020682, dated Jun. 25, 2024.

ZTE, Sanechips, Discussion on NR sidelink physical layer structure, R1-1900774, 3GPP TSG RAN WG1 Ad-Hoc Meeting 1901 Taipei, Jan. 21-25, 2019.

The secnd Office Action of corresponding AU application No. 2019421242, dated Oct. 24, 2024.

R1-1813421, 'Considerations on Physical Layer aspects of NR V2X', Qualcomm Incorporated, 3GPP TSG RAN WG1 Meeting #95, Spokane, USA, Nov. 12-16, 2018, pp. 1-16.

* cited by examiner

SIDELINK COMMUNICATION METHOD, TERMINAL DEVICE AND NETWORK DEVICE

CROSS-REFERENCE TO RELATED APPLICATIONS

This application is a continuation of U.S. patent application Ser. No. 17/366,593, filed on Jul. 2, 2021, which is a continuation of International Patent Application No. PCT/CN2019/071497, filed on Jan. 11, 2019. The aforementioned patent applications are hereby incorporated by reference in their entireties.

TECHNICAL FIELD

The embodiments of the present application relate to the field of communications and, in particular, to a sidelink communication method, a terminal device, and a network device.

BACKGROUND

In New Radio (NR)-Vehicle to Everything (V2X), in order to reduce the delay, a Physical Sidelink Control Channel (PSCCH) and its corresponding Physical Sidelink Shared Channel (PSSCH) adopt multiplexing structures different from those adopted in the long-term Evolution (LTE)-V2X. In the multiplexing structure adopted by the NR-V2X, how to transmit the PSCCH is a problem to be solved.

SUMMARY

The embodiments of the present application provide a sidelink communication method, a terminal device, and a network device, which are beneficial to reducing the complexity of blind PSCCH detection by the terminal device.

In a first aspect, a sidelink communication method is provided. The method includes: determining, by a terminal device, a time frequency resource of a physical sidelink control channel PSCCH in a first time frequency unit; and receiving or transmitting, by the terminal device, the PSCCH on the time frequency resource.

In a second aspect, a sidelink communication method is provided, the method includes: determining, by a network device, a first parameter; and transmitting, by the network device, the first parameter to a terminal device, wherein the first parameter is used by the terminal device to determine a time domain symbol starting position of a physical sidelink control channel PSCCH in a time frequency unit.

In a third aspect, a terminal device is provided, which is configured to execute the method in the foregoing first aspect or in each implementation manner thereof.

Specifically, the terminal device includes a functional module for executing the method in the foregoing first aspect or in each implementation manner thereof.

In a fourth aspect, a network device is provided, which is used to execute the method in the second aspect or in each implementation manner thereof.

Specifically, the network device includes a functional module for executing the method in the foregoing second aspect or in each implementation manner thereof.

In a fifth aspect, a terminal device is provided, including a processor and a memory. The memory is configured to store a computer program, and the processor is configured to call and run the computer program stored in the memory to execute the method in the first aspect or in each implementation manner thereof.

In a sixth aspect, a network device is provided, including a processor and a memory. The memory is configured to store a computer program, and the processor is configured to call and run the computer program stored in the memory, and execute the method in the second aspect or in each implementation manner thereof.

In a seventh aspect, a chip is provided for implementing the method in any one of the foregoing first to second aspects or in each implementation manner thereof.

Specifically, the chip includes: a processor, configured to call and run a computer program from a memory, so that a device installed with the chip executes the method in any one of the foregoing first to the second aspect or in each implementation manner thereof.

In an eighth aspect, a computer-readable storage medium is provided for storing a computer program that enables a computer to execute the method in any one of the foregoing first to the second aspect or in each implementation manner thereof.

In a ninth aspect, a computer program product is provided, including computer program instructions which cause a computer to execute the method in any one of the foregoing first to the second aspect or in each implementation manner thereof.

In a tenth aspect, a computer program is provided, which when running on a computer, causes a computer to execute the method in any one of the foregoing first to the second aspect or in each implementation manner thereof.

Through the above technical solutions, the terminal device can first determine the time frequency resource of the PSCCH in the first time frequency unit, and detect the PSCCH on the determined time frequency resource, so that the terminal device, as a receiving end, can clearly know the specific position of the PSCCH in a time frequency unit, therefore, the complexity of blind PSCCH detection by the terminal device is reduced.

DETAILED DESCRIPTION

Figure 1:
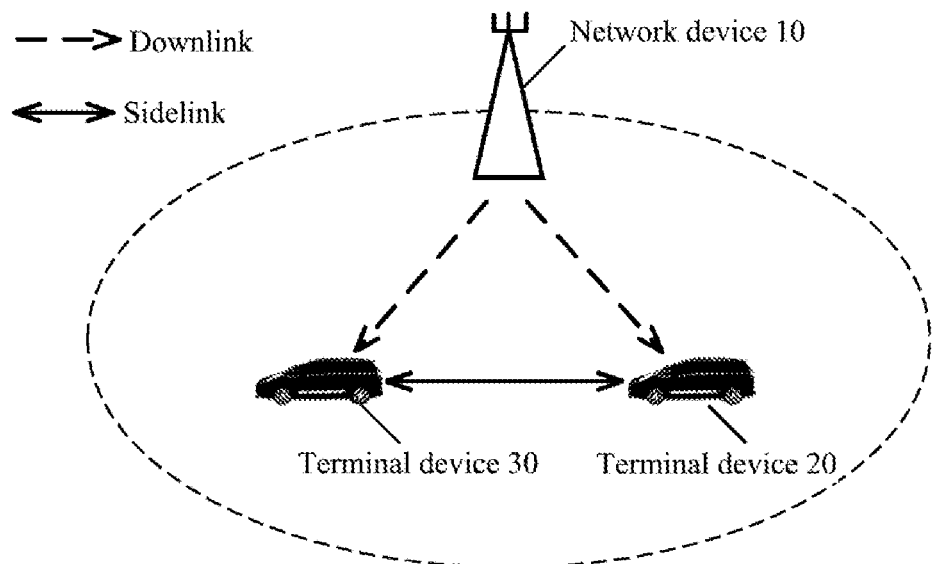
FIG. 1 is a schematic diagram of a sidelink communication system provided by an embodiment of the present application.

The technical solutions in the embodiments of the present application will be described below in conjunction with the drawings in the embodiments of the present application. Obviously, the described embodiments are a part of the embodiments of the present application, not all of the embodiments. Based on the embodiments in the present application, all other embodiments obtained by those of ordinary skill in the art without paying creative work shall fall within the protection scope of the present application.

It should be understood that the technical solutions of the embodiments of the present application can be applied to various communication systems, such as: a Global System of Mobile communication (Global System of Mobile communication, GSM) system, a Code Division Multiple Access (Code Division Multiple Access, CDMA) system, a Wideband Code Division Multiple Access (Wideband Code Division Multiple Access, WCDMA) system, General Packet Radio Service (General Packet Radio Service, GPRS), a Long Term Evolution (LTE) system, an LTE Frequency Division Duplex (Frequency Division Duplex, FDD) system, an LTE Time Division Duplex (Time Division Duplex, TDD), a Universal Mobile Telecommunication System (Universal Mobile Telecommunication System, UMTS), a Worldwide Interoperability for Microwave Access (Worldwide Interoperability for Microwave Access, WiMAX) communication system, a New Radio (New Radio, NR) or a future 5G System etc.

In particular, the technical solutions of the embodiments of the present application can be applied to various communication systems based on non-orthogonal multiple access technologies, such as a Sparse Code Multiple Access (Sparse Code Multiple Access, SCMA) system, a Low Density Signature (Low Density Signature, LDS) system, etc. Of course, the SCMA system and LDS system can also be named differently in the communication field; further, the technical solutions of the embodiments of the present application can be applied to multi-carrier transmission systems using non-orthogonal multiple access technologies, such as Orthogonal Frequency Division Multiplexing (Orthogonal Frequency Division Multiplexing, OFDM), Filter Bank Multi-Carrier (Filter Bank Multi-Carrier, FBMC), Generalized Frequency Division Multiplexing (Generalized Frequency Division Multiplexing, GFDM), Filtered-OFDM (Filtered-OFDM, F-OFDM) systems using non-orthogonal multiple access technologies.

The terminal device in the embodiments of the present application may refer to user equipment (user equipment, UE), an access terminal, a user unit, a user station, a mobile station, a mobile platform, a remote station, a remote terminal, a mobile equipment, a user terminal, a terminal, a wireless communication equipment, a user agent or a user device. The access terminal can be a cellular phone, a cordless phone, a Session Initiation Protocol (Session Initiation Protocol, SIP) phone, a Wireless Local Loop (Wireless Local Loop, WLL) station, a Personal Digital Assistant (Personal Digital Assistant, PDA), and a handheld device with wireless communication functions, computing devices or other processing devices connected to wireless modems, on-board device, wearable device, terminal devices in the future 5G network or in a Public Land Mobile Network (Public Land Mobile Network, PLMN) of future evolution, etc., are not limited in the embodiments of the present application.

The network device in the embodiments of the present application may be a device for communicating with the terminal device. The network device may be a Base Transceiver Station (Base Transceiver Station, BTS) in GSM or CDMA, or a NodeB (NB) in a WCDMA system, it can also be an Evolutional NodeB (Evolutional NodeB, eNB or eNodeB) in an LTE system, or a wireless controller in a Cloud Radio Access Network (Cloud Radio Access Network, CRAN) scenario, or the network device can be a relay station, an access point, an on-board device, a wearable device, a network device in the future 5G network or in a PLMN network of the future evolution, etc., which is not limited in the embodiments of the present application.

Figure 2:
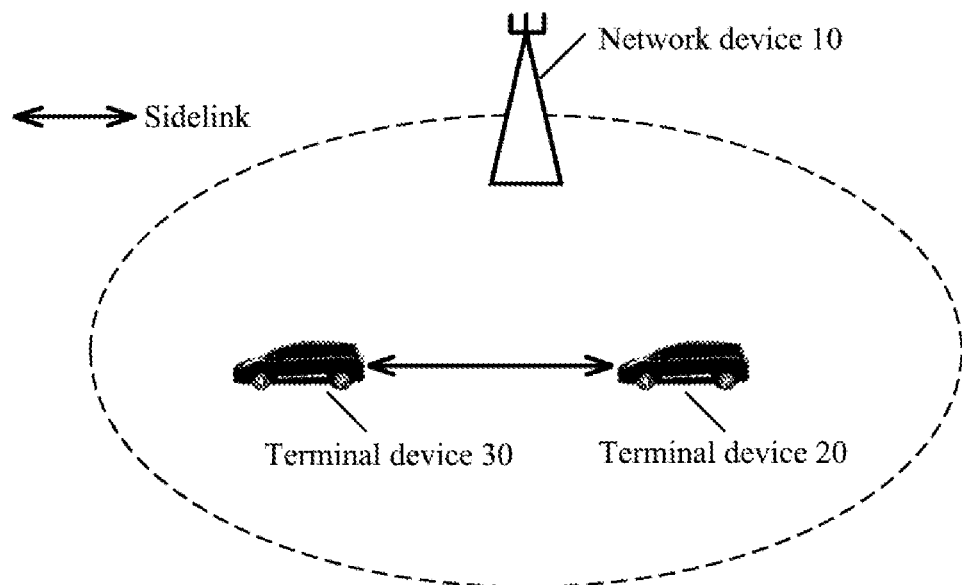
FIG. 2 is a schematic diagram of a sidelink communication system provided by an embodiment of the present application.

FIG. 1 and FIG. 2 are schematic diagrams of an application scenario of an embodiment of the present application. FIG. 1 exemplarily shows one network device and two terminal devices. In an implementation, the wireless communication system may include multiple network devices and the coverage of each network device may include other numbers of terminal devices. The embodiment does not limit this. In addition, the wireless communication system may also include other network entities such as a Mobile Management Entity (Mobile Management Entity, MME), a Serving Gateway (Serving Gateway, S-GW), a Packet Data Network Gateway (Packet Data Network Gateway, P-GW), etc. However, the embodiments of the present application are not limited to this.

Specifically, the terminal device 20 and the terminal device 30 may communicate in a Device-to-Device (D2D) communication mode. When performing D2D communication, the terminal device 20 and the terminal device 30 communicate directly through the D2D link, that is, the Sidelink (Sidelink, SL). For example, as shown in FIG. 1 or FIG. 2, the terminal device 20 and the terminal device 30 communicate directly through a sidelink. In FIG. 1, the terminal device 20 and the terminal device 30 communicate through the sidelink, a transmission resource thereof is allocated by the network device; in FIG. 2, the terminal device 20 and the terminal device 30 communicate through the sidelink, a transmission resource thereof is independently selected by the terminal device, and no network device is required to allocate the transmission resource.

The D2D communication mode can be applied to Vehicle to Vehicle (Vehicle to Vehicle, V2V) communication or Vehicle to Everything (Vehicle to Everything, V2X) communication. In V2X communication, X can generally refer to any device with wireless receiving and sending capabilities, such as but not limited to slow-moving wireless devices, fast-moving on-board devices, or network control nodes with wireless transmitting and receiving capabilities. It should be understood that the embodiments of the present application are mainly applied to the scenario of V2X communication, but may also be applied to any other D2D communication scenarios, which is not limited in the embodiments of the present application.

LTE-V2X is standardized in Release-14 of the 3GPP protocol, and two transmission modes are defined, namely a transmission mode 3 (mode 3) and a transmission mode 4 (mode 4). A transmission resource of the terminal device using the transmission mode 3 is allocated by a base station, and the terminal device transmits data on the sidelink according to the resource allocated by the base station; the base station may allocate, for the terminal device, a resource for a single transmission, or allocate, for the terminal device, a resource for semi-static transmission. If the terminal device using the transmission mode 4 has a sensing capability, it may transmit data by way of sensing and reservation, if the terminal device does not have the sensing capability, the transmission resource is randomly selected from a resource pool. A terminal device with the sensing capability obtains a set of available resources in the resource pool by way of sensing, and the terminal device randomly selects a resource from the set for data transmission. Since the services in the Internet of Vehicles system have periodic characteristics, the terminal device usually adopts semi-static transmission, that is, after the terminal device selects a transmission resource, it will continue to use the resource in multiple transmission cycles, thereby reducing a probability of recurrent selection and resource conflict. The terminal device will carry, in the control information of this transmission, information about reservation of a resource for the next transmission, so that other terminal devices can determine whether the resource is reserved and used by the terminal device by detecting the control information of the terminal device, thereby meeting the purpose of reducing resource conflict.

Figure 3:
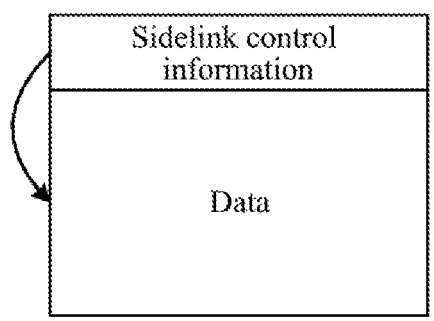
FIG. 3 is a schematic block diagram of a mode for transmitting sidelink data provided by an embodiment of the present application.

In LTE-V2X, the data transmitted on the sidelink adopts a transmission manner of sidelink control information (Sidelink Control Information, SCI)+data as shown in FIG. 3, where the SCI carries information required for data demodulation, such as modulation and coding scheme (Modulation and Coding Scheme, MCS), time frequency resource allocation information, priority information, etc. The terminal device at the receiving end obtains a time frequency resource position of the data by detecting the SCI, and detects the data on the corresponding time frequency resource. The SCI is carried on a PSCCH, and the data is carried on a PSSCH. A resource pool for the PSCCH and a resource pool for the PSSCH are pre-configured through a protocol or configured by a network. The terminal device at the transmitting end respectively transmits the PSCCH and PSSCH in corresponding resource pools, and the terminal device at the receiving end first blindly detects the PSCCH in the resource pool for the PSCCH, and then detects the PSSCH corresponding to the SCI on the corresponding time frequency resource in the resource pool for the PSSCH according to indication information in the SCI carried by the PSCCH.

Figure 4:
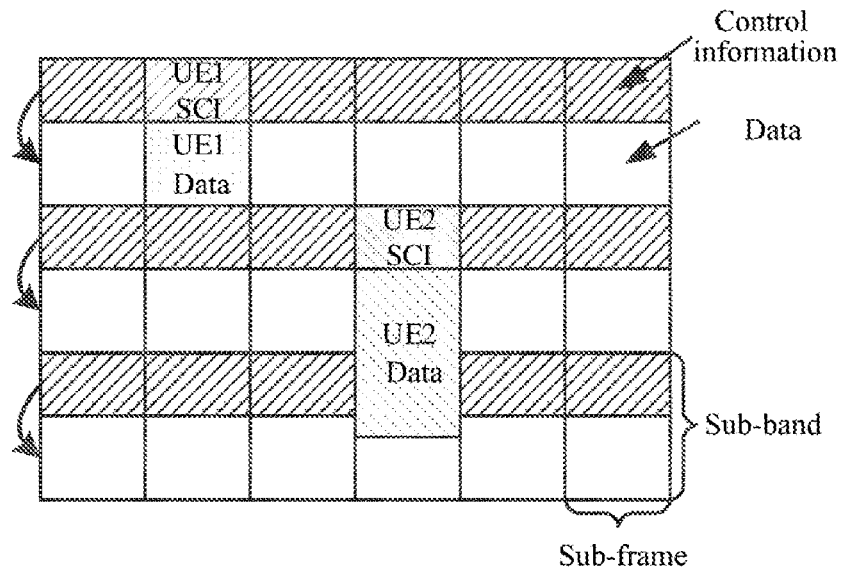
FIG. 4 is a schematic block diagram of a resource pool configuration for control information and data in LTE-V2X.
Figure 4:
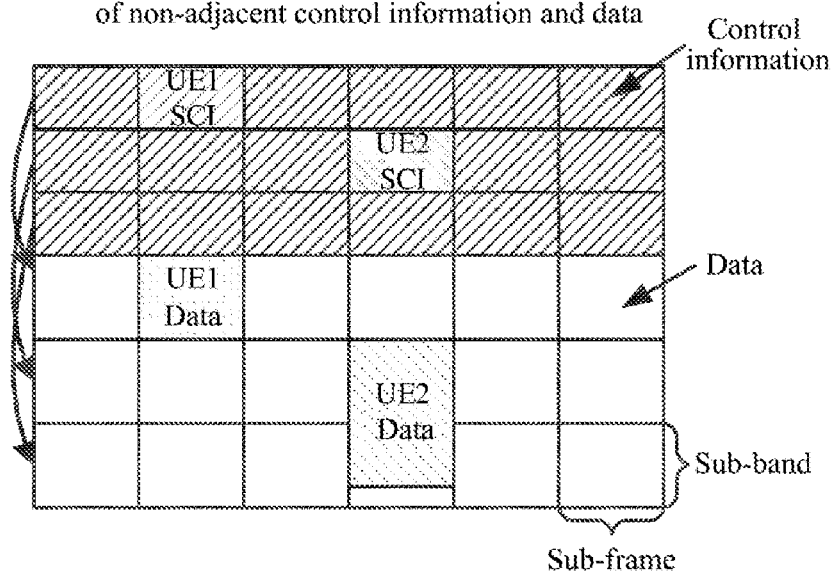

In LTE-V2X, data and its corresponding control information are located in the same subframe, and are FDM. Specifically, there are two ways to configure the resource pool of control information and data: adjacent (adjacent) in a frequency domain and non-adjacent (non-adjacent) in the frequency domain, the specific relationship is shown in FIG. 4.

The adjacent way means that the control information and its corresponding data are adjacent in the frequency domain. The bandwidth of the entire system is granulated in sub-bands, and each sub-band contains multiple continuous physical resource blocks (Physical Resource Block, PRB), the first and second PRBs in each sub-band are available control resources (each control information occupies two adjacent PRBs in the frequency domain), and the remaining PRBs are available data resources. The data resources have a one-to-one correspondence with the control resources, and a starting position of a data resource is determined by its corresponding control resource. The data resource can occupy one sub-band (e.g. UE1 in FIG. 4), or across multiple sub-bands (e.g. UE2 in FIG. 4). When data occupies multiple sub-bands, the data is continuous in the frequency domain in multiple sub-bands, and can occupy control resources in other sub-bands, and the control information corresponding to the data is located in the control resource located in the first sub-band. As shown in FIG. 4, data of UE2 occupies two adjacent sub-bands, so its corresponding control information is in the control resource of the first sub-band.

In NR-V2X, it is necessary to support autonomous driving, so higher requirements are put forward for data interaction between vehicles, such as higher throughput, lower delay, higher reliability, larger coverage and more flexible resource allocation, etc.

In the NR-V2X system, multiple transmission modes are introduced, such as a mode 1 and a mode 2. Wherein, the mode 1 is that the network allocates a transmission resource for the terminal (similar to a mode 3 in LTE-V2X), and the mode 2 is that the terminal selects a transmission resource, the mode 2 includes but not limited to the following modes.

Mode 2a: the terminal autonomously selects a transmission resource (similar to a mode 4 in LTE-V2X); for example, the terminal autonomously selects a resource from a pre-configured or network-configured resource pool (the resource can be selected randomly, or through sensing).

Mode 2b: the terminal assists other terminals in selecting resources; for example, a first terminal sends auxiliary information to a second terminal. The auxiliary information may include, but is not limited to: available time frequency resource information, available transmission resource set information, channel measurement information, and channel quality information (e.g. channel state information (Channel State Information, CSI), channel quality indicator (Channel Quality Indicator, CQI), precoding matrix indicator (Precoding Matrix Indicator, PMI), rank indication (rank indication, RI), reference signal receiving power (Reference Signal Receiving Power, RSRP), reference signal receiving quality (Reference Signal Receiving Quality, RSRQ), received signal strength indicator (Received Signal Strength Indicator, RSSI), path loss information, etc.).

Mode 2c: the terminal selects a resource from the transmission resource configured for it; for example, the network configures multiple transmission resources for each terminal, and when the terminal has sidelink data transmission, the terminal performs data transmission through the transmission resource selected from the multiple transmission resources configured by the network.

Figure 5:
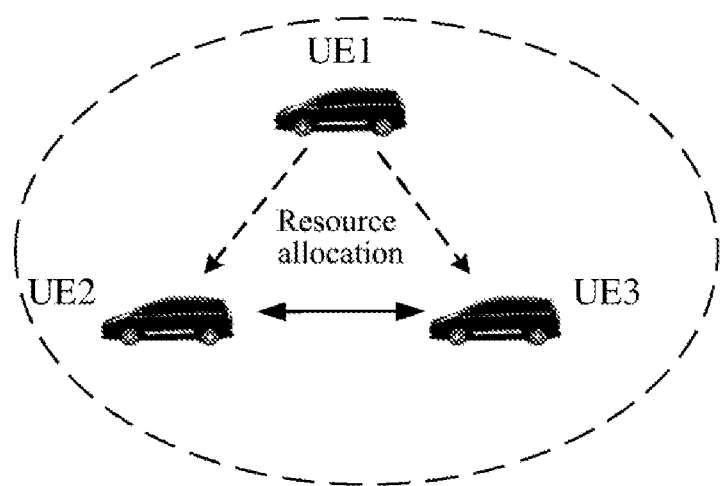
FIG. 5 is a schematic diagram of a resource allocation manner in NR-V2X.

Mode 2d: the first terminal allocates a transmission resource for the second terminal; for example, the first terminal is a group head of group communication, the second terminal is a group member of the group, and the first terminal directly allocates a time frequency resource for sidelink transmission to the second terminal. As shown in FIG. 5, UE1, UE2, and UE3 form a communication group. UE1 is the group head of the group and has functions such as resource management, allocation, and control. UE2 and the UE3 are group members. UE1 can allocate sidelink transmission resources for UE2 and UE3. UE2 and UE3 perform sidelink transmission on the resources allocated by UE1.

Figure 6:
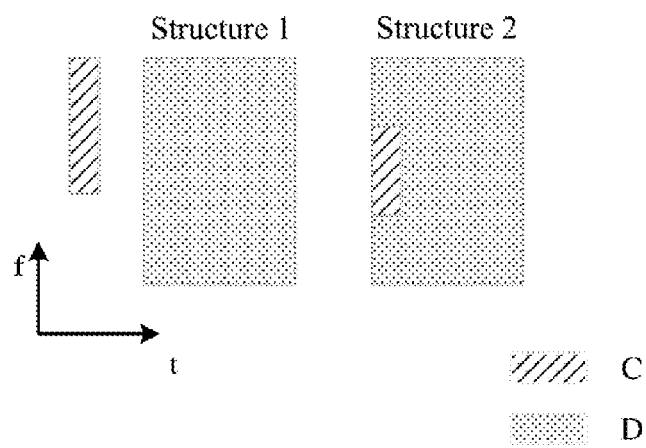
FIG. 6 is a schematic diagram of two structures adopted in transmission of control information and data in NR-V2X.
Figure 7:
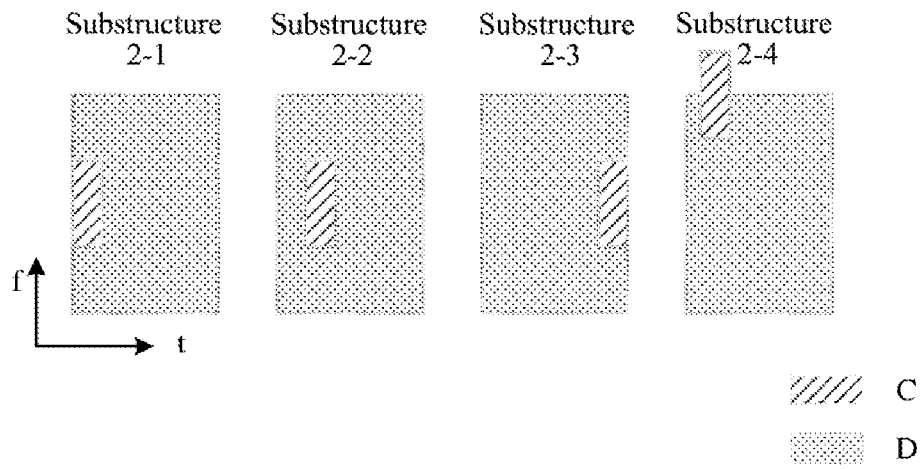
FIG. 7 is a schematic diagram of various substructures included in Structure 2 of NR-V2X.

In NR-V2X, in order to reduce time delay, sidelink control information (SCI) and its corresponding data adopt a new multiplexing structure, as shown in FIG. 6 and FIG. 7. Where C represents control information, and D represents data, that is, in a subframe or time slot, the control information occupies part of time domain symbols, and the terminal device may obtain the indication information for demodulating data by detecting the control information, thereby detecting the data. The control information only occupying part of the time domain symbols can achieve fast demodulation of the control information, thereby achieving the purpose of reducing time delay.

As shown in FIG. 6, the multiplexing structure adopted by NR-V2X is mainly divided into Structure 1 and Structure 2. Structure 1 means that control information can be transmitted before data, and control information and data occupy different time domain resources. Further, the control information and the data scheduled by the control information can be transmitted in the same time slot or different time slots; Structure 2 means that the time domain resource of the control information can partially overlap with the time domain resource of the data.

Regarding the Structure 2, it may include 4 substructures as shown in FIG. 7: Substructure 2-1, Substructure 2-2, Substructure 2-3, and Substructure 2-4.

As known from FIG. 7, for Structure 2, a time domain resource of the PSCCH can occupy any time domain symbol in a subframe or a time slot, and a frequency domain resource of the PSCCH can also occupy a part of sub-bands of a system bandwidth or a bandwidth part (BWP). How to determine the time frequency resource occupied by the PSCCH is a problem to be solved.

Figure 8:
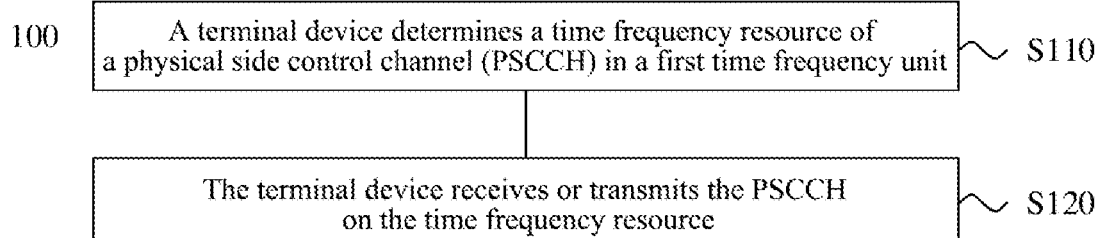
FIG. 8 is a schematic block diagram of a sidelink communication method provided by an embodiment of the present application.

FIG. 8 is a schematic block diagram of a sidelink communication method 100 provided by an embodiment of the present application. The method may be executed by a terminal device as the receiving end in FIG. 1 or FIG. 2. As shown in FIG. 8, the method 100 includes some or all of the following contents:

S110, a terminal device determines a time frequency resource of a physical sidelink control channel PSCCH in a first time frequency unit.

S120, the terminal device receives or transmits the PSCCH on the time frequency resource.

It should be noted that the first time frequency unit may include a time unit in a time domain, and the time unit may be a subframe or a time slot, or may be a time unit composed of a specific number of time domain symbols. The first time frequency unit may include a frequency domain unit in a frequency domain, and the frequency domain unit may be a system bandwidth, a bandwidth part, or a frequency domain unit composed of a specific number of sub-bands.

Specifically, transmission of sidelink data is required to be scheduled by SCI, that is, the SCI carries information required for data demodulation, and the SCI is carried on a PSCCH. When performing sidelink communication, the terminal device performs transmission by taking a time frequency unit as a basis. When the PSCCH is required to be transmitted, the terminal device, as a transmitting end, is required to first determine the time frequency resource used to transmit the PSCCH in a current time frequency unit. The time frequency resource includes a time-domain resource and/or a frequency domain resource, and then the terminal device at the transmitting end can transmit the PSCCH on the determined time frequency resource. The terminal device as a receiving end is also required to first determine over which time frequency resources in the current time frequency unit the receiving or detection of the PSCCH is to be performed, and then receive or detect the PSCCH on the corresponding time frequency resources.

It should be understood that for the terminal device at the transmitting end, the time frequency resource of the PSCCH refers to the transmission resource of the PSCCH; for the terminal device at the receiving end, the time frequency resource of the PSCCH refers to the receiving resource of the PSCCH.

In particular, the solutions in the embodiments of the present application are applicable to the multiplexing structure used to transmit PSCCH and PSSCH in FIG. 6 or FIG. 7. For Structure 1, the PSCCH and the PSSCH scheduled by the PSCCH occupy different time domain resources, and for Structure 2, the time domain resource occupied by the PSSCH which is scheduled by the PSCCH is greater than the time domain resource occupied by the PSCCH.

In an implementation, the determining the time frequency resource of the PSCCH in the time frequency unit may include determining a time domain resource and/or a frequency-domain resource of the PSCCH in a time frequency unit.

Specifically, the determining the time-domain resource of the PSCCH in the time frequency unit may include determining at least one of a starting time domain symbol position, an ending time domain symbol position, or the number of time domain symbols occupied of the PSCCH in the time frequency unit.

In an implementation, the starting time domain symbol position of the PSCCH, the ending time domain symbol position of the PSCCH, or the number of time domain symbols occupied by the PSCCH in the time frequency unit can be determined by protocol pre-configuration information (e.g., pre-agreed in the protocol), configuration information of a network device (e.g., the network device configures through a broadcast message, radio resource control signaling, or control information and the like), or may also be determined by a further terminal device. For example, the further terminal device may be a group head of the communication group where the terminal device is located.

In an implementation, the starting time domain symbol position or the ending time domain symbol position of the PSCCH in the time frequency unit can be determined by index information of the time domain symbol or an offset relative to a specific time domain symbol. For example, a protocol stipulates that the starting time domain symbol position of the PSCCH in a time frequency unit is the first time domain symbol, then the protocol pre-configuration information may include an indication field to indicate the index information of the first time domain symbol in the time frequency unit. For another example, if the network device configures the ending time domain symbol position of the PSCCH for the terminal device as the last time domain symbol in the time frequency unit, the configuration information may include an indication field to indicate an index value of the last time domain symbol in the time frequency unit. For another example, the network device configures, for the terminal device, the offset (relative to the fourth time domain symbol) of the starting time domain symbol position of the PSCCH in the time frequency unit is 2, then the terminal device can know that the starting time domain symbol position of the PSCCH is the sixth time domain symbol in the time frequency unit. For another example, the protocol pre-determines that the offset (relative to the fourth time domain symbol) of the ending time domain symbol position of the PSCCH in the time frequency unit is 2, then the terminal device can know the ending time domain symbol position of the PSCCH in the time frequency unit is the second time domain symbol.

In an implementation, the number of time domain symbols occupied by the PSCCH in the time frequency unit may be represented by the A bit. For example, if the maximum number of time domain symbols occupied by the PSCCH is 4, 2 bits can be used to indicate the number of time domain symbols occupied by the PSCCH in the time frequency unit.

In an implementation, in the embodiments of the present application, the terminal device may also determine the starting time domain symbol position of the PSCCH in a time slot or subframe according to a first parameter. The first parameter may be determined by protocol pre-configuration information, configuration information of a network device, or configuration information of a further terminal device. The first parameter may be related to the number of time domain symbols that the terminal device is required to sense or measure in a time frequency unit.

Generally, in a time frequency unit, the terminal device is required to sense or measure first, and then decides whether to transmit the PSCCH and/or the PSSCH or not according to a result of the sensing or measurement, for example, the number of time domain symbols required to be sensed or measured in a time frequency unit is P, and the terminal device can determine the starting time domain symbol position of the PSCCH in the time frequency unit according to the number of time domain symbols P (that is, the first parameter) required to be sensed or measured. For example, the start symbol position is P+1 or P+2.

It should be noted that the sensing or measurement usually starts from the first symbol in the time frequency unit, and the number of time domain symbols that the terminal device is required to sense or measure in the time frequency unit is P, which can also be understood as, the terminal device is required to sense or measure the first P time domain symbols in the time frequency unit.

In a time frequency unit, the terminal device that wants to transmit a PSCCH and/or a PSSCH will determine whether the time slot or subframe can be used to transmit the PSCCH and/or the PSSCH or not according to the result of sensing or measurement. Different terminal devices may have different sensing or measuring parameters. For example, the network device may configure different sensing parameters for different terminal devices. The parameter may be, for example, the number of time domain symbols whose signal energy measured by the terminal device is lower than a threshold. The terminal device initializes the parameter according to the configuration information of the network. For example, an initial value of the parameter is Q. When the energy on the time domain symbol measured by the terminal device is lower than the threshold, the parameter is reduced by 1. When the energy is higher than or equal to the threshold, the parameter remains unchanged, and the energy of the next time domain symbol continues to be measured. When the parameter is reduced to 0, the terminal device will transmit the PSCCH and/or PSSCH on the subsequent time domain symbol. In a time frequency unit, the parameter configured for different terminal devices may be different. For example, for the first terminal device, the parameter may be 2, and for the second terminal device, the parameter may be 3. When the first terminal device senses or measures that energies on two time domain symbols are lower than the threshold in the time frequency unit, the first terminal device can preempt the next time domain symbol for transmission; when the second terminal device senses or measures that energies on three time domain symbols are lower than the threshold in the time frequency unit, the second terminal device can preempt the next time domain symbol for transmission. A terminal device whose sensing parameter first reduced to 0 can preempt a resource for transmission.

Then in a time frequency unit, if there is at least one terminal device transmitting the PSCCH and the PSSCH, since different terminal devices are required to sense or measure different numbers of time domain symbols, the starting time domain symbols for transmitting the PSCCH determined by different terminal devices may also be different. Different terminal devices obtain the same first parameter according to the protocol pre-configuration information or the configuration information of the network device. Furthermore, different terminal devices may determine, according to the same rule, the same starting time domain symbol position in the time frequency unit to start transmitting or receiving the PSCCH.

In an implementation, the first parameter may be a position K of the first time domain symbol for receiving the PSCCH in the time frequency unit, where K is an integer. That is, for all terminal devices at the transmitting end, they can simply transmit the PSCCH from the first parameter or the corresponding time domain symbol after the first parameter; and for all terminal devices at the receiving end, they can simply receive or detect the PSCCH from the first parameter or the corresponding time domain symbol after the first parameter as well. For example, the terminal device can directly determine the time domain symbol position corresponding to K as the starting time domain symbol position of the PSCCH in the time frequency unit, and then the terminal device can start transmitting or receiving the PSCCH from a time domain symbol corresponds to K in the time frequency unit. Specifically, if K is the third time domain symbol in the time frequency unit, the terminal device can start transmitting or receiving the PSCCH from the third time domain symbol in the time frequency unit, or the terminal device can also start transmitting or receiving the PSCCH from the fourth or the fifth time domain symbol in the time frequency unit, as long as the terminal device does not start transmitting or receiving the PSCCH from a time domain symbol before the time domain symbol corresponds to K.

In an implementation, K may be the maximum value of starting time domain symbol positions available for transmitting the PSCCH and corresponding to at least one terminal device in a time frequency unit. Since the number of time domain symbols required to be sensed or measured by different terminal devices is different, the starting time domain symbol positions available for transmitting the PSCCH and preempted by different terminal devices in the time frequency unit are also different, which will increase complexity of PSCCH detection by the terminal device at the receiving end, that is, the terminal device is required to detect the PSCCH on all possible time domain symbols. For example, the first time domain symbol position of the terminal device 1 available for transmitting the PSCCH is 1, the first time domain symbol position of the terminal device 2 available for transmitting the PSCCH is 2, and the terminal device 3 available for transmitting the PSCCH is 3. For the terminal device 4 at the receiving end, it is thus uncertain about: the PSCCH has been sent by which one of the terminal device 1, the terminal device 2 and the terminal device 3. Therefore, it needs to start receiving or detecting from time domain symbols with time domain symbol positions of 1, 2, and 3.

If the maximum value of starting time domain symbol positions that can be preempted by multiple terminal devices for PSCCH transmission in a time frequency unit can be determined as K, then the terminal device at the transmitting end among the multiple terminal devices can start transmitting the PSCCH from a determined time domain symbol position, and the terminal device at the receiving end can start detecting the PSCCH from a determined time domain symbol position, instead of detecting the PSCCH on all possible time domain symbols in the time frequency unit. For example, in the above example, for the terminal device 1, the terminal device 2, the terminal device 3, and the terminal device 4, the network device can configure the maximum value 3 of the first time domain symbol positions available for transmitting the PSCCH in the terminal device 1, the terminal device 2, and the terminal device 3 as the starting time domain symbol position for transmitting or receiving the PSCCH, then no matter the PSCCH is sent by which of the terminal device 1, the terminal device 2 or the terminal device 3, the terminal device 4 at the receiving end may start receiving or detecting the PSCCH from the time domain symbol whose time domain symbol position is 3.

In an implementation, the first parameter may be the maximum value M of the number of time domain symbols required to be sensed or measured in a time frequency unit, where M is an integer. That is, for all terminal devices at the transmitting end, they can simply transmit the PSCCH from the corresponding time domain symbol after the first parameter; and for all terminal devices at the receiving end, they can simply receive or detect the PSCCH from the corresponding time domain symbol after the first parameter as well. For example, the terminal device can directly determine the starting time domain symbol position of the PSCCH in the time frequency unit as a time domain symbol position corresponding to (M+i), and then the terminal device may start receiving or transmitting the PSCCH from a time domain symbol of which time domain symbol position corresponds to (M+i) in the first time frequency unit. Where i is a positive integer, and i can be determined according to a subcarrier interval, and different subcarrier intervals correspond to different values of i, and i may be determined by protocol pre-configuration information, configuration information of a network device, or configuration information of a further terminal device. In an implementation, the time domain symbols (M+1) to (M+i−1) can be used for the terminal device to perform a receiving to transmitting conversion/or a transmitting to receiving conversion. In an implementation, at least one time domain symbol is required for the terminal device to perform the receiving to transmitting conversion/or transmitting to receiving conversion. For example, for a subcarrier interval of 120 kHz, i can be 3, where the time domain symbols (M+1), (M+2) can be used for the terminal device to perform the receiving to transmitting conversion; and for a subcarrier interval of 30 kHz, i can be 2, where the time domain symbol (M+1) can be used for the terminal device to perform the receiving to transmitting conversion; for a subcarrier spacing of 15 kHz, i can be 1, and the time domain symbol (M+1) can be used for terminal device to perform the receiving to transmitting conversion.

In an implementation, M may be the maximum value of the number of time domain symbols required to be sensed corresponding to at least one terminal device in a time frequency unit. Since the number of time domain symbols required to be sensed to or measured by different terminal devices is different, if the maximum number of time domain symbols required to be sensed or measured by multiple terminal devices in a time frequency unit can be determined as M, then the terminal device serving as the receiving end among the multiple terminal devices can determine the starting time domain symbol position for transmitting the PSCCH in the time frequency unit according to the same rule, and then can start detecting the PSCCH from the determined time domain symbol, it no longer needs to detect the PSCCH on all possible time domain symbols in a time frequency unit. For example, the terminal device 1 is required to sense 1 time domain symbol, the terminal device 2 is required to sense 2 time domain symbols, and the terminal device 3 is required to sense 3 time domain symbols. If the network device configures the maximum number 3 (i.e. the parameter M=3) of time domain symbols required to be sensed in the terminal device 1, the terminal device 2, and the terminal device 3 as the maximum number of time domain symbols that each terminal device is required to sense in the time frequency unit. If the starting time domain symbol position of the PSCCH in the time frequency unit agreed in the protocol or configured by the network is the time domain symbol position corresponding to (M+2), then the terminal device serving as the receiving end among the terminal device 1, the terminal device 2 and the terminal device 3 may start receiving or detecting the PSCCH sent by other terminal devices from the time domain symbol corresponding to the time domain symbol position 5.

In an implementation, the determining the time frequency resource of the PSCCH in the time frequency unit may also include determining any two of a frequency domain starting position, a frequency domain ending position, and a frequency domain resource length of the PSCCH in the time frequency unit.

In an implementation, the frequency domain starting position, the frequency domain ending position, or the frequency domain resource length of the PSCCH in the time frequency unit can be determined by protocol pre-configuration information (for example, pre-agreed in the protocol), configuration information of the network device (for example, the network device configures through a broadcast message, radio resource control signaling or control information and the like), or it can also be determined by the configuration information of the terminal device that is the group head in the communication group where the terminal device is located.

In an implementation, the frequency domain starting position or the frequency domain ending position of the PSCCH in a unit may be represented by index information of the frequency domain unit or an offset relative to a specific frequency domain unit. For example, the frequency domain starting position or the frequency domain ending position of the PSCCH may be represented by the index information of a resource block or a sub-band or a resource block group. For another example, the frequency domain starting position or the frequency domain ending position of the PSCCH may be represented by an offset relative to a specific frequency domain unit. The specific frequency domain unit may be: a starting position of a bandwidth, a starting position of a BWP, a starting position of a resource pool, a frequency domain position of a carrier center, the lowest frequency domain position of a synchronization signal, and the lowest frequency domain position of a physical sidelink broadcast channel (Physical sidelink broadcast channel, PSBCH).

In an implementation, the frequency domain resource length of the PSCCH in the time frequency unit may be represented by indication information about a size of the frequency domain resource. For example, B bit is used to indicate the number of frequency domain units occupied by the PSCCH. The frequency domain unit may be a resource block, a sub-band, or a resource block group.

Alternatively, the terminal device may also determine the frequency domain resource length of the PSCCH in the time frequency unit according to an aggregation level of the PSCCH to be transmitted. For example, a mapping relationship between different aggregation levels and frequency domain resource lengths can be configured through pre-configuration information or configuration information of a network. The terminal device at the transmitting end can determine the frequency domain resource length of the PSCCH in the time frequency unit according to the aggregation level of the current PSCCH to be transmitted and the mapping relationship. If the terminal device at the receiving end knows the aggregation level of the PSCCH to be received, the terminal device determines the frequency domain resource length of the PSCCH according to the aggregation level and the mapping relationship; if the terminal device at the receiving end does not know the aggregation level of the PSCCH to be received, the terminal device needs to determine the frequency domain resource length of the PSCCH corresponding to each aggregation level according to each of all possible aggregation levels and the mapping relationship, and detects the PSCCH according to the frequency domain resource length. If the detection fails, the frequency domain resource length of the PSCCH will be re-determined according to the next aggregation level and the PSCCH will be re-detected. If the detection succeeds, the aggregation level used at this time is the aggregation level used by the PSCCH, and the frequency domain resource length corresponding to the aggregation level is the frequency domain resource length of the PSCCH.

In all the foregoing embodiments, various information and parameters of the time domain resource or frequency domain resource used to determine the PSCCH can all be determined by protocol pre-definition (i.e., pre-configuration information) or configuration information of a network. For example, a resource pool for the PSCCH is pre-defined by a protocol or configured by a network, and configuration information of the resource pool includes the foregoing various information or parameters. For another example, the network device may transmit the configuration information through broadcast information, RRC signaling, downlink control signaling, etc. The configuration information configures at least one PSCCH resource pool, and the configuration information of the resource pool includes the foregoing various information or parameters. Alternatively, the network device configures at least one BWP, and configuration information of the BWP includes the foregoing various information or parameters.

Figure 9:
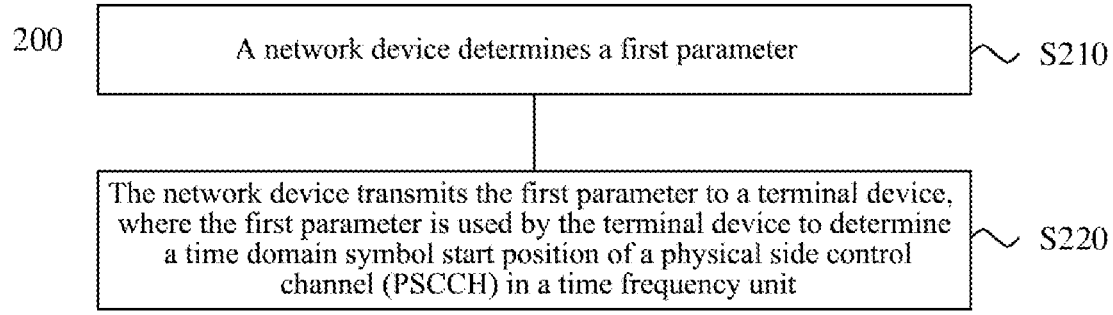
FIG. 9 is another schematic block diagram of a sidelink communication method provided by an embodiment of the present application.

FIG. 9 is a schematic block diagram of a sidelink communication method 200 provided by an embodiment of the present application. As shown in FIG. 9, the method 200 includes part or all of the following contents:

S210, a network device determines a first parameter;

S220, the network device transmits the first parameter to a terminal device, where the first parameter is used by the terminal device to determine a time domain symbol starting position of a physical sidelink control channel PSCCH in a time frequency unit.

In an implementation, in the embodiments of the present application, the determining, by the network device, the first parameter includes: acquiring, by the network device, a number of time domain symbols required to be sensed and configured for at least one terminal device in a time frequency unit; and determining, by the network device, a maximum value K of the number of time domain symbols required to be sensed or measured of the at least one terminal device as the first parameter, where K is an integer.

In an implementation, in the embodiments of the present application, the determining, by the network device, the first parameter includes: acquiring, by the network device, a starting time domain symbol position which is configured for at least one terminal device and is available for transmitting the PSCCH in a time frequency unit; and determining, by the network device, a maximum value M of starting time domain symbol positions of the at least one terminal device available for transmitting the PSCCH as the first parameter, where M is an integer.

In an implementation, in the embodiments of the present application, the method further includes: transmitting, by the network device, at least one of the following information to the terminal device: a starting time domain symbol position of the PSCCH in a time frequency unit, a number of time domain symbols occupied by the PSCCH in a time frequency unit, an ending time domain symbol position of the PSCCH in a time frequency unit, a starting position of a frequency domain of the PSCCH in a time frequency unit, an ending position of the frequency domain of the PSCCH in a time frequency unit or a length of a frequency domain resource of the PSCCH in a time frequency unit.

In an implementation, in the embodiments of the present application, the starting time domain symbol position of the PSCCH in the time frequency unit is represented by index information of a time domain symbol or an offset relative to a specific time domain symbol, and/or the starting position of the frequency domain of the PSCCH in the time frequency unit is represented by index information of a frequency domain unit or an offset relative to a specific frequency domain unit, and/or the length of the frequency domain resource of the PSCCH in the time frequency unit is represented by information indicating a size of the frequency domain resource.

In an implementation, in the embodiments of the present application, a time domain resource occupied by a PSSCH which is scheduled by the PSCCH is greater than a time domain resource occupied by the PSCCH.

In an implementation, in the embodiments of the present application, a time domain resource occupied by the PSCCH is different from a time domain resource occupied by a PSSCH which is scheduled by the PSCCH.

In an implementation, in this embodiments of the present application, the time frequency unit includes one time slot or one subframe in time domain.

It should be understood that the interaction between the network device and the terminal device and related characteristics and functions described with respect to the network device correspond to the related characteristics and functions of the terminal device. That is, the network device transmits what message to the terminal device, the terminal device receives the corresponding message from the network device.

It should also be understood that in the various embodiments of the present application, the sequence numbers of the processes discussed above do not mean the order of execution. The execution order of each process should be determined by its function and internal logic, and should not constitute any limitation to the implementation process of the embodiments of the present application.

The foregoing describes in detail the sidelink communication method according to the embodiments of the present application. The sidelink communication device according to the embodiments of the present application will be described below in conjunction with FIG. 10 to FIG. 13. The technical features described in the method embodiments are applicable to the following apparatus embodiments.

Figure 10:
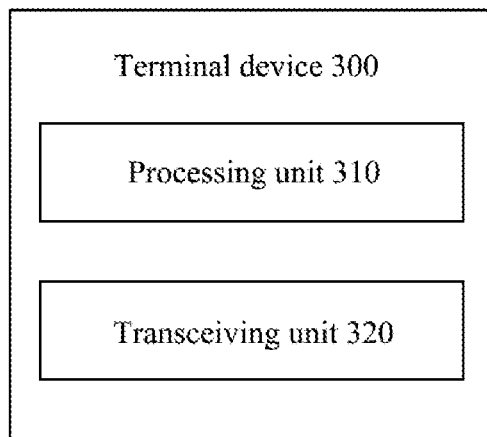
FIG. 10 is a schematic block diagram of a terminal device provided by an embodiment of the present application.

FIG. 10 shows a schematic block diagram of a terminal device 300 provided by an embodiment of the present application. As shown in FIG. 10, the terminal device 300 includes:

a processing unit 310, configured to determine a time frequency resource of a physical sidelink control channel PSCCH in a first time frequency unit; and a transceiving unit 320, configured to receive or transmit the PSCCH on the time frequency resource.

In an implementation, in the embodiments of the present application, the processing unit is specifically configured to: determine at least one of the following information of the PSCCH in the first time frequency unit: a starting time domain symbol position, a number of time domain symbols occupied, an ending time domain symbol position, a frequency domain starting position, a frequency domain resource length, or a frequency domain ending position.

In an implementation, in the embodiments of the present application, the processing unit is specifically configured to determine the starting time domain symbol position of the PSCCH in the first time frequency unit according to a first parameter.

In an implementation, in the embodiments of the present application, the first parameter includes a position K of a first time domain symbol used to receive a PSCCH in a time frequency unit, and K is an integer.

In an implementation, in the embodiments of the present application, the processing unit is specifically configured to determine the starting time domain symbol position of the PSCCH in the first time frequency unit as a time domain symbol position corresponding to K; the transceiving unit is specifically configured to start receiving or transmitting the PSCCH from a time domain symbol of which time domain symbol position corresponds to K in the first time frequency unit.

In an implementation, in the embodiments of the present application, K is the maximum value of the starting time domain symbol positions available for transmitting PSCCH and corresponding to at least one terminal device in a time frequency unit.

In an implementation, in the embodiments of the present application, the first parameter includes the maximum value M of the number of time domain symbols required to be sensed or measured in a time frequency unit, and M is an integer.

In an implementation, in the embodiments of the present application, the processing unit is specifically configured to determine the starting time domain symbol position of the PSCCH in the first time frequency unit as a time domain symbol position corresponding to (M+i), where i is an integer, and i is a parameter related to a carrier interval; the transceiving unit is specifically configured to start receiving or transmitting the PSCCH from a time domain symbol of which time domain symbol position corresponds to (M+i) in the first time frequency unit.

In an implementation, in the embodiments of the present application, the maximum value M is a maximum value of a number of time domain symbols required to be sensed or measured corresponding to at least one terminal device in a time frequency unit.

In an implementation, in the embodiments of the present application, the first parameter is determined by protocol pre-configuration information or configuration information of a network device.

In an implementation, in the embodiments of the present application, the processing unit is specifically configured to determine the frequency domain resource length of the PSCCH in the first time frequency unit according to an aggregation level used by the PSCCH.

In an implementation, in the embodiments of the present application, at least one of the following information is determined according to protocol pre-configuration information or configuration information of a network device: a starting time domain symbol position of the PSCCH in the first time frequency unit, a number of time domain symbols occupied by the PSCCH in the first time frequency unit, an ending time domain symbol position of the PSCCH in the first time frequency unit, a frequency domain starting position of the PSCCH in the first time frequency unit, a frequency domain ending position of the PSCCH in the first time frequency unit, or a frequency domain resource length of the PSCCH in the first time frequency unit.

In an implementation, in the embodiment of the present application, the starting time domain symbol position of the PSCCH in the first time frequency unit is represented by index information of a time domain symbol or an offset relative to a specific time domain symbol, and/or the starting position of the frequency domain of the PSCCH in the first time frequency unit is represented by index information of a frequency domain unit or an offset relative to a specific frequency domain unit, and/or the frequency domain resource length of the PSCCH in the first time frequency unit is represented by indication information about a size of the frequency domain resource.

In an implementation, in the embodiment of the present application, a time domain resource occupied by a PSSCH which is scheduled by the PSCCH is greater than a time domain resource occupied by the PSCCH.

In an implementation, in the embodiment of the present application, a time domain resource occupied by the PSCCH is different from a time domain resource occupied by a PSSCH which is scheduled by the PSCCH.

In an implementation, in the embodiment of the present application, the time frequency unit includes a time slot or a subframe in a time domain.

It should be understood that the terminal device 300 according to an embodiment of the present application may correspond to the terminal device in the method embodiment of the present application, and the foregoing and other operations and/or functions of each unit in the terminal device 300 are for implementing the corresponding process of the terminal device in the method of FIG. 8. For the sake of brevity, it will not be repeated here.

Figure 11:
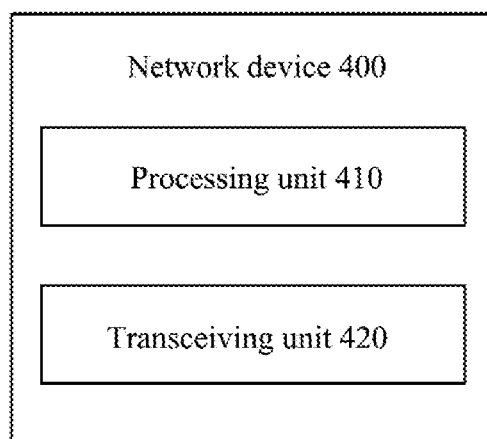
FIG. 11 is a schematic block diagram of a network device provided by an embodiment of the present application.

FIG. 11 shows a schematic block diagram of a network device 400 provided by an embodiment of the present application. As shown in FIG. 11, the network device 400 includes:

a processing unit 410, configured to determine a first parameter; and a transceiving unit 420, configured to transmit the first parameter to a terminal device, where the first parameter is used by the terminal device to determine a time domain symbol starting position of a physical sidelink control channel PSCCH in a time frequency unit.

In an implementation, in the embodiment of the present application, the processing unit is specifically configured to acquire the number of time domain symbols required to be sensed and configured for at least one terminal device in a time frequency unit; and determine the maximum value K of the number of time domain symbols required to be sensed as the first parameter, and K is an integer.

In an implementation, in the embodiment of the present application, the processing unit is specifically configured to acquire a starting time domain symbol position which is configured for at least one terminal device and is available for transmitting the PSCCH in a time frequency unit; and determine the maximum value M of starting time domain symbol positions of the at least one terminal device available for transmitting PSCCH as the first parameter, and M is an integer.

In an implementation, in the embodiment of the present application, the transceiving unit is further configured to transmit to the terminal device, at least one of the following information: a starting time domain symbol position of the PSCCH in a time frequency unit, a number of time domain symbols occupied by the PSCCH in a time frequency unit, an ending time domain symbol position of the PSCCH in a time frequency unit, a frequency domain starting position of the PSCCH in a time frequency unit, a frequency domain ending position of the PSCCH in a time frequency unit, or a frequency domain resource length of the PSCCH in a time frequency unit.

In an implementation, in the embodiment of the present application, the starting time domain symbol position of the PSCCH in the time frequency unit is represented by index information of a time domain symbol or an offset relative to a specific time domain symbol, and/or the starting position of the frequency domain of the PSCCH in the time frequency unit is represented by index information of a frequency domain unit or an offset relative to a specific frequency domain unit, and/or the frequency domain resource length of the PSCCH in the time frequency unit is represented by indication information about a size of the frequency domain resource.

In an implementation, in the embodiment of the present application, a time domain resource occupied by a PSSCH which is scheduled by the PSCCH is greater than a time domain resource occupied by the PSCCH.

In an implementation, in the embodiment of the present application, a time domain resource occupied by the PSCCH is different from a time domain resource occupied by a PSSCH which is scheduled by the PSCCH.

In an implementation, in the embodiment of the present application, the time frequency unit includes one time slot or one subframe in a time domain.

It should be understood that the network device 400 according to an embodiment of the present application may correspond to the network device in the method embodiment of the present application, and the foregoing and other operations and/or functions of each unit in the network device 400 are for implementing the corresponding process of the terminal device in the method of FIG. 9. For the sake of brevity, it will not be repeated here.

Figure 12:
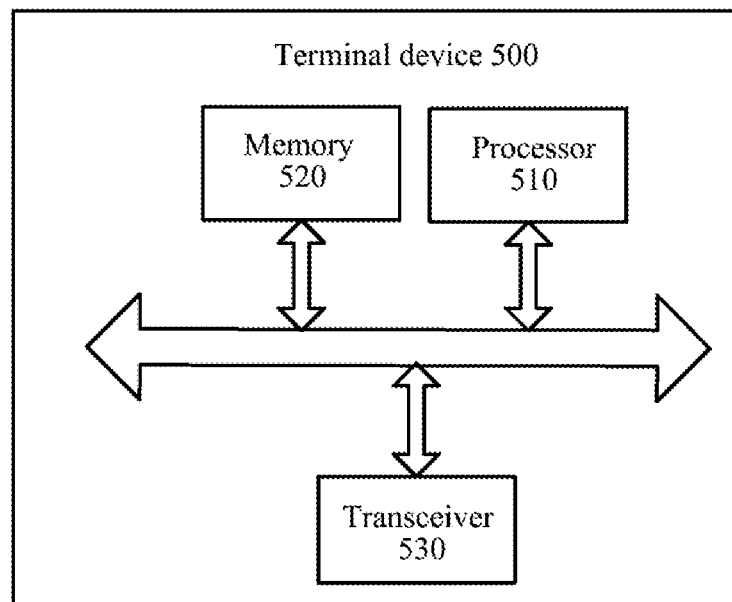
FIG. 12 is another schematic block diagram of a terminal device provided by an embodiment of the present application.

As shown in FIG. 12, an embodiment of the present application also provides a terminal device 500. The terminal device 500 may be the terminal device 300 in FIG. 10, which can be configured to execute the content corresponding to the terminal device in the method 100 of FIG. 8. The terminal device 500 shown in FIG. 12 includes a processor 510, and the processor 510 can call and run a computer program from a memory to implement the method in the embodiments of the present application.

In an implementation, as shown in FIG. 12, the terminal device 500 may further include a memory 520. Where the processor 510 can call and run a computer program from the memory 520 to implement the method in the embodiments of the present application.

Where the memory 520 may be a separate device independent of the processor 510, or may be integrated in the processor 510.

In an implementation, as shown in FIG. 12, the terminal device 500 may further include a transceiver 530, and the processor 510 may control the transceiver 530 to communicate with other devices. Specifically, it may transmit information or data to other devices, or receive information or data sent by other devices.

Where the transceiver 530 may include a transmitter and a receiver. The transceiver 530 may further include an antenna, and the number of the antennas may be one or more.

In an implementation, the terminal device 500 may be a terminal device provided in the embodiments of the present application, and the terminal device 500 may implement the corresponding process implemented by the terminal device in each method of the embodiments of the present application. For the sake of brevity, details will not be described herein again.

In a specific embodiment, the processing unit in the terminal device 300 may be implemented by the processor 510 in FIG. 12. The transceiving unit in the terminal device 300 may be implemented by the transceiver 530 in FIG. 12.

Figure 13:
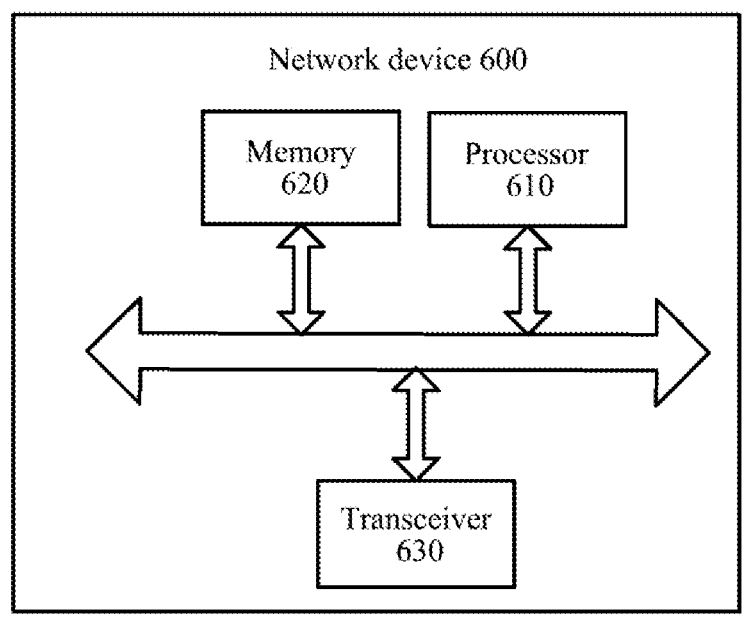
FIG. 13 is another schematic block diagram of a network device provided by an embodiment of the present application.

As shown in FIG. 13, an embodiment of the present application also provides a network device 600. The network device 600 may be the network device 400 in FIG. 11, which can be configured to execute the content of the network device corresponding to the method 200 in FIG. 9. The network device 600 shown in FIG. 13 includes a processor 610, and the processor 610 can call and run a computer program from a memory to implement the method in the embodiments of the present application.

In an implementation, as shown in FIG. 13, the network device 600 may further include a memory 620. Where the processor 610 may call and run a computer program from the memory 620 to implement the method in the embodiments of the present application.

The memory 620 may be a separate device independent of the processor 610, or may be integrated in the processor 610.

In an implementation, as shown in FIG. 13, the network device 600 may further include a transceiver 630, and the processor 610 may control the transceiver 630 to communicate with other devices. Specifically, it may transmit information or data to other devices, or receive information or data sent by other devices.

Where the transceiver 630 may include a transmitter and a receiver. The transceiver 630 may further include an antenna, and the number of the antennas may be one or more.

In an implementation, the network device 600 may be a network device provided in the embodiment of the present application, and the network device 600 may implement the corresponding process implemented by the terminal device in each method of the embodiments of the present application. For the sake of brevity, details will not be described herein again.

In a specific embodiment, the processing unit in the network device 400 may be implemented by the processor 610 in FIG. 13. The transceiving unit in the network device 400 may be implemented by the transceiver 630 in FIG. 13.

Figure 14:
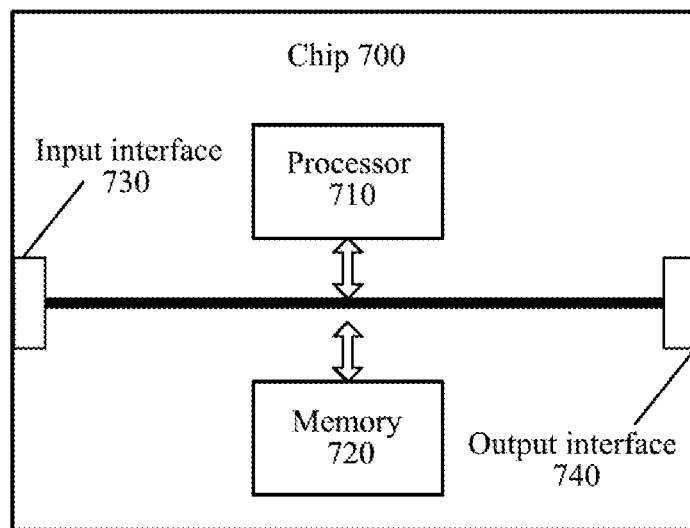
FIG. 14 is a schematic block diagram of a chip provided by an embodiment of the present application.

FIG. 14 is a schematic structural diagram of a chip provided by an embodiment of the present application. A chip 700 shown in FIG. 14 includes a processor 710, and the processor 710 can call and run a computer program from a memory to implement the method in the embodiments of the present application.

In an implementation, as shown in FIG. 14, the chip 700 may further include a memory 720. Where the processor 710 may call and run a computer program from the memory 720 to implement the method in the embodiments of the present application.

Where the memory 720 may be a separate device independent of the processor 710, or may be integrated in the processor 710.

In an implementation, the chip 700 may further include an input interface 730. The processor 710 may control the input interface 730 to communicate with other devices or chips, and specifically, may acquire information or data sent by other devices or chips.

In an implementation, the chip 700 may further include an output interface 740. The processor 710 may control the output interface 740 to communicate with other devices or chips, and specifically, may output information or data to other devices or chips.

In an implementation, the chip can be applied to the terminal device in the embodiments of the present application, and the chip can implement the corresponding process implemented by the terminal device in each method of the embodiments of the present application. For the sake of brevity, details will not be described herein again.

In an implementation, the chip can be applied to the network device in the embodiment of the present application, and the chip can implement the corresponding process implemented by the network device in each method of the embodiments of the present application. For the sake of brevity, details will not be described here again.

It should be understood that the chip mentioned in the embodiments of the present application may also be referred to as a system level chip, a system chip, a chip system, or a system-on-a-chip.

Figure 15:
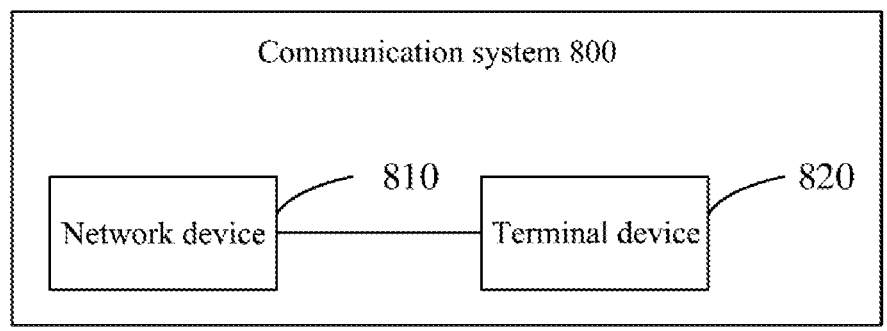
FIG. 15 is a schematic block diagram of a communication system provided by an embodiment of the present application.

FIG. 15 is a schematic block diagram of a communication system 800 provided by an embodiment of the present application. As shown in FIG. 15, the communication system 800 includes a network device 810 and a terminal device 820.

Where the network device 810 can be configured to implement the corresponding functions implemented by the network device in the above methods, and the terminal device 820 can be configured to implement the corresponding functions implemented by the terminal device in the above methods. For the sake of brevity, details will not be described herein again.

It should be understood that the terms "system" and "network" are often used interchangeably herein. The term "and/or" herein is only an association relationship that describes the associated objects, which means that there can be three relationships, for example, A and/or B, which means three situations: A exists alone, A and B exist at the same time, B exists alone. In addition, the character "/" in this text generally indicates that the associated objects before and after it are in an "or" relationship.

It should be understood that, the processor in the embodiments of the present application may be an integrated circuit chip having a capability of signal processing. In the implementation process, each step of the foregoing method embodiments may be completed by an integrated logic circuit of hardware in the processor or an instruction in a form of software. The processor may be a general processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a discrete gate or a transistor logic device, and a discrete hardware component. The methods, steps and logical diagrams disclosed in the embodiments of the present application may be implemented or executed. The general processor may be a microprocessor or the processor may also be any conventional processor or the like. The steps of the method disclosed in the embodiments of the present application may be directly executed by a hardware decoding processor, or by a combination of the hardware and software modules in the decoding processor. The software modules may be located in a mature storage medium in the art, i.e. a random memory, a flash memory, a read-only memory, a programmable read-only memory, or an electrically erasable programmable memory, a register, etc. The storage medium is located in a memory, the processor reads information in the memory, and completes the steps of the above methods in combination with hardware thereof.

It can be understood that, the memory in the embodiments of the present application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which functions as an external cache. Description is illustrative but not restrictive, RAM in many forms may be available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM, an enhanced synchronous dynamic random access memory (Enhanced SDRAM, ESDRAM), a synchronous connection dynamic random access memory (Synchlink DRAM, SLDRAM) and a direct Rambus random access memory (Direct Rambus RAM, DR RAM). It should be noted that, the memory in the systems and methods described herein is intended to include, but is not limited to, these and any memory in other suitable types.

It should be understood that, description of the above memory is illustrative but not restrictive. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM, an enhanced synchronous dynamic random access memory (enhanced SDRAM, ESDRAM), a synchronous connection dynamic random access memory (synch link DRAM, SLDRAM) and a direct Rambus random access memory (Direct Rambus RAM. DR RAM) and the like. That is, the memory in the embodiments of the present application is intended to include, but is not limited to, these and any memory in other suitable types.

An embodiment of the present application further provides a computer readable storage medium for storing a computer program.

In an implementation, the computer readable storage medium may be applied to a network device in the embodiments of the present application, and the computer program may cause a computer to execute corresponding processes implemented by the network device in various methods in the embodiments of the present application. It is not described herein for simplicity.

In an implementation, the computer readable storage medium may be applied to a terminal device in the embodiments of the present application, and the computer program may cause a computer to execute corresponding processes implemented by the terminal device in various methods in the embodiments of the present application. It is not described herein for simplicity.

An embodiment of the present application further provides a computer program product which includes computer program instructions.

In an implementation, the computer program product may be applied to a network device in the embodiments of the present application, and the computer program instructions may cause a computer to execute corresponding processes implemented by the network device in various methods in the embodiments of the present application. It is not described herein for simplicity.

In an implementation, the computer program product may be applied to a terminal device in the embodiments of the present application, and the computer program instructions may cause a computer to execute corresponding processes implemented by the mobile terminal/the terminal device in various methods in the embodiments of the present application. It is not described herein for simplicity.

An embodiment of the present application further provides a computer program.

In an implementation, the computer program may be applied to a network device in the embodiments of the present application, when the computer program is run on a computer, the computer may be caused to execute corresponding processes implemented by the network device in various methods in the embodiments of the present application. It is not described herein for simplicity.

In an implementation, the computer program may be applied to a terminal device in the embodiments of the present application, when the computer program is run on a computer, the computer may be caused to execute corresponding processes implemented by the mobile terminal/the terminal device in various methods in the embodiments of the present application. It is not described herein for simplicity.

Persons of ordinary skill in the art may realize that, the units and algorithm steps described in the embodiments disclosed herein may be implemented in electronic hardware, or a combination of computer software and electronic hardware. Whether these functions are executed in a manner of hardware or software depends on the particular application and design constraints of the technical solution. Professionals may use different methods for each particular application to implement the described functions, but such implementations should not be considered to be beyond the scope of the present application.

A person skilled in the pertinent art may clearly understand that, for the convenience and simplicity of description, the specific working processes of the systems, apparatuses and units described above may refer to the corresponding processes in the foregoing method embodiments, and are not described herein again.

In the several embodiments provided in the present application, it should be understood that, the disclosed systems, apparatuses and methods may be implemented in other manners. For example, the apparatus embodiments described above are merely schematic. For example, the division of the units is merely a logical function division, and there may be another division manner in an actual implementation. For example, a plurality of units or components may be combined or integrated in another system, or some features may be ignored or not performed. In another point, the displayed or discussed coupling to each other or direct coupling or a communication connection may be through some interfaces. Indirect coupling or a communication connection of the devices or the units may be electrical, mechanical or in other forms.

The units described as separate components may or may not be physically separate, and the components displayed as units may or may not be physical units, that is, may be located in one place, or may be distributed to a plurality of network units. Some or all of the units may be selected according to actual needs to achieve the purpose of the solution of the present embodiment.

In addition, each functional unit in each embodiment of the present application may be integrated in one processing unit, or each unit may be physically present separately, or two or more units may be integrated in one unit.

If the functions are implemented in the form of a software functional unit and sold or used as an independent product, it can be stored in a computer readable storage medium. Based on this understanding, the technical solution of the present application essentially or the part that contributes to the existing technology or a part of the technical solution can be embodied in the form of a software product, and the computer software product is stored in a storage medium, including several instructions used to cause a computing device (which may be a personal computer, a server, or a network device, etc.) to execute all or part of the steps of the method described in each embodiment of the present application. The foregoing storage medium include: a U disk, a mobile hard disk, a read-only memory (Read-Only Memory, ROM), a random access memory (Random Access Memory, RAM), a magnetic disk or an optical disk and other mediums that can store program codes.

The above are merely specific embodiments of the present application, but the protection scope of the present application is not limited thereto. Any variation or replacement readily conceivable by a person skilled in the art within the technical scope disclosed in the present application should be covered within the protection scope of the present application. Therefore, the protection scope of the present application should be defined by the protection scope of the claims.

What is claimed is:

1. A sidelink communication method, comprising:
receiving, by a terminal device, a first parameter from a network device, wherein the first parameter comprises an integer K which indicates a first time domain symbol for transmitting or receiving a physical sidelink control channel (PSCCH) and is used by the terminal device to determine a starting time domain symbol position of the PSCCH;
determining, by the terminal device, a time frequency resource of the PSCCH in a first time frequency unit according to the first parameter; and
receiving or transmitting, by the terminal device, the PSCCH on the determined time frequency resource;
wherein the determining, by the terminal device, the time frequency resource of the PSCCH in the first time frequency unit according to the first parameter comprises:
determining, by the terminal device, a starting time domain symbol position of the PSCCH in the first time frequency unit according to the first parameter;

wherein the receiving or transmitting, by the terminal device, the PSCCH on the determined time frequency resource comprises:
  starting receiving or transmitting, by the terminal device, the PSCCH from the starting time domain symbol position of the PSCCH determined in the first time frequency unit;
  wherein a time domain resource occupied by a PSSCH which is scheduled by the PSCCH is greater than a time domain resource occupied by the PSCCH.

2. The method according to claim 1, further comprising:
determining, by the terminal device, at least one of the following information:
  a number of time domain symbols occupied by the PSCCH in the first time frequency unit,
  an ending time domain symbol position of the PSCCH in the first time frequency unit,
  a frequency domain starting position of the PSCCH in the first time frequency unit,
  a frequency domain ending position of the PSCCH in the first time frequency unit, or
  a frequency domain resource length of the PSCCH in the first time frequency unit.

3. The method according to claim 2, wherein
the starting time domain symbol position of the PSCCH in the first time frequency unit is represented by index information of a time domain symbol or an offset relative to a specific time domain symbol, and/or
the starting position of the frequency domain of the PSCCH in the first time frequency unit is represented by index information of a frequency domain unit or an offset relative to a specific frequency domain unit, and/or
the frequency domain resource length of the PSCCH in the first time frequency unit is represented by indication information about a size of the frequency domain resource.

4. The method according to claim 1, wherein a time domain resource occupied by the PSCCH is different from a time domain resource occupied by a PSSCH which is scheduled by the PSCCH, and the time domain resource occupied by the PSCCH partially overlaps with the time domain resource occupied by the PSSCH.

5. The method according to claim 1, wherein the first time frequency unit comprises a time slot, a subframe or a time unit composed of a specific number of time domain symbols in a time domain.

6. The method according to claim 1, wherein the first time frequency unit comprises a system bandwidth, a bandwidth part (BWP), or a frequency domain unit composed of a specific number of sub-bands in a frequency domain.

7. A sidelink communication method, comprising:
  determining, by a network device, a first parameter, wherein the first parameter comprises an integer K which indicates a first time domain symbol for transmitting or receiving a physical sidelink control channel (PSCCH) and is used by a terminal device to determine a starting time domain symbol position of the PSCCH, to enable the terminal device to determine the starting time domain symbol position of the PSCCH in a first time frequency unit according to the first parameter and start to receiving or transmitting the PSCCH from the starting time domain symbol position of the PSCCH determined in the first time frequency unit; and
  transmitting, by the network device, the first parameter to the terminal device, wherein the first parameter is used by the terminal device to determine a time frequency resource in the first time frequency unit for transmitting or receiving the PSCCH;
  wherein a time domain resource occupied by a PSSCH which is scheduled by the PSCCH is greater than a time domain resource occupied by the PSCCH.

8. The method according to claim 7, further comprising:
  transmitting, by the network device, at least one of the following information to the terminal device:
    a number of time domain symbols occupied by the PSCCH in the first time frequency unit,
    an ending time domain symbol position of the PSCCH in the first time frequency unit,
    a frequency domain starting position of the PSCCH in the first time frequency unit,
    a frequency domain ending position of the PSCCH in the first time frequency unit, or
    a frequency domain resource length of the PSCCH in the first time frequency unit.

9. The method according to claim 8, wherein
the starting time domain symbol position of the PSCCH in the time frequency unit is represented by index information of a time domain symbol or an offset relative to a specific time domain symbol, and/or
the starting position of the frequency domain of the PSCCH in the time frequency unit is represented by index information of a frequency domain unit or an offset relative to a specific frequency domain unit, and/or
the frequency domain resource length of the PSCCH in the time frequency unit is represented by indication information about a size of the frequency domain resource.

10. The method according to claim 7, wherein a time domain resource occupied by the PSCCH is different from a time domain resource occupied by a PSSCH which is scheduled by the PSCCH, and the time domain resource occupied by the PSCCH partially overlaps with the time domain resource occupied by the PSSCH.

11. The method according to claim 7, wherein the first time frequency unit comprises a time slot, a subframe or a time unit composed of a specific number of time domain symbols in a time domain.

12. A terminal device, comprising:
  a processor and a memory,
wherein the memory is configured to store a computer program, the processor is configured to call and run the computer program stored in the memory, and execute the method according to claim 1.

13. A network device, comprising:
  a processor and a memory,
wherein the memory is used to store a computer program, the processor is used to call and run the computer program stored in the memory, and execute the method according to claim 7.

14. A non-transitory computer-readable storage medium, configured to store a computer program that enables a computer to execute the method according to claim 1.

15. A non-transitory computer-readable storage medium, configured to store a computer program that enables a computer to execute the method according to claim 7.

* * * * *